(12) United States Patent
Tabor et al.

(10) Patent No.: US 10,287,135 B1
(45) Date of Patent: May 14, 2019

(54) GRABBING MECHANISM

(71) Applicant: LOON LLC, Mountain View, CA (US)

(72) Inventors: Mathew Tabor, San Francisco, CA (US); Keegan Gartner, Los Gatos, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 15/910,224

(22) Filed: Mar. 2, 2018

(51) Int. Cl.
| | |
|---|---|
| *B66C 1/66* | (2006.01) |
| *B25J 15/00* | (2006.01) |
| *B64B 1/58* | (2006.01) |

(52) U.S. Cl.
CPC ............ *B66C 1/66* (2013.01); *B25J 15/00* (2013.01); *B64B 1/58* (2013.01)

(58) Field of Classification Search
CPC ........... B66C 1/62; B66C 1/66; B64D 17/383; F16B 21/165; B25J 15/00; B64B 1/58; G05D 16/00
USPC ...................................... 294/82.28, 192, 194
See application file for complete search history.

(56) References Cited

U.S. PATENT DOCUMENTS

| | | | | | |
|---|---|---|---|---|---|
| 2,393,962 | A | * | 2/1946 | Ashton | F15B 15/261 294/82.28 |
| 2,751,229 | A | * | 6/1956 | Schultz | B23B 31/1071 279/22 |
| 2,796,284 | A | * | 6/1957 | Benson | B64D 1/04 294/82.26 |
| 3,403,650 | A | * | 10/1968 | Black | F42B 10/56 102/387 |
| 3,825,980 | A | * | 7/1974 | Moore | F41F 3/052 114/238 |
| 4,082,342 | A | * | 4/1978 | Ailshie | B62D 33/071 180/89.15 |
| 4,585,369 | A | * | 4/1986 | Manesse | B63B 21/502 166/338 |
| 4,636,135 | A | * | 1/1987 | Bancon | B25J 15/0491 29/26 A |
| 4,815,780 | A | * | 3/1989 | Obrist | B23Q 1/0009 294/86.4 |
| 4,987,968 | A | * | 1/1991 | Martus | F16C 1/12 180/271 |

(Continued)

FOREIGN PATENT DOCUMENTS

| | | |
|---|---|---|
| EP | 0782897 B1 | 6/2002 |
| JP | 2010214568 A | 9/2010 |

*Primary Examiner* — Dean J Kramer
(74) *Attorney, Agent, or Firm* — Botos Churchill IP Law

(57) ABSTRACT

Aspects of the disclosure relate to grabbing, holding and releasing an object including a pull stud. For instance, a grabbing mechanism may include a piston chamber having a piston configured to move within the piston chamber when the piston chamber is pressurized. The mechanism may also include a collet attached to the piston such that the collet and piston move together when the piston moves. The collet may include a groove. The mechanism may also include ball cage including a plurality of balls arranged at least partially within respective ball chambers of the ball cage. The ball cage may be arranged at least partially within the collet such that movement of the piston and collet causes the groove to align with the respective ball chambers. The plurality of balls may be configured to move into and out of the groove and to lock the pull stud within the mechanism.

19 Claims, 14 Drawing Sheets

(56) References Cited

U.S. PATENT DOCUMENTS

| | | | |
|---|---|---|---|
| 7,963,717 B2 * | 6/2011 | Seger | F16B 21/165 |
| | | | 279/50 |
| 9,180,955 B2 * | 11/2015 | Ratner | B66C 1/42 |
| 9,649,698 B2 | 5/2017 | Muramatsu | |
| 2012/0087756 A1 | 4/2012 | Kanematsu | |

* cited by examiner

GRABBING MECHANISM

BACKGROUND

Various systems, such as cranes and other devices, employ grabbing mechanisms to grab, hold, lift, and move objects. These mechanisms may include hooks, pneumatically operated claws or grabbers, etc. However, few grabbing mechanisms allow for reliable and rapid grabbing and releasing of those objects. This can be especially important in situations in which the grabbing mechanism is attached to a crane under high loads. Moreover, identifying the state of the grabbing mechanism, including whether an object is properly engaged and released is critical to safe operation of such systems.

BRIEF SUMMARY

Aspects of the present disclosure provide a system for grabbing an object including a pull stud. The system includes a grabbing mechanism including a piston chamber having a piston configured to move within the piston chamber when the piston chamber is pressurized; a collet attached to the piston such that the collet and piston move together when the piston moves, the collet including a groove; and a ball cage including a plurality of balls arranged at least partially within respective ball chambers of the ball cage. The ball cage is arranged at least partially within the collet such that movement of the piston and collet causes the groove to align with the respective ball chambers, wherein the plurality of balls are configured to move into and out of the groove and to lock the pull stud within the grabbing mechanism.

In one example, the grabbing mechanism further includes a spring configured to bias the piston in a first direction such that pressurization of the piston chamber causes the piston to overcome a force of the spring on the piston. In this example, the spring is arranged around a portion of the ball cage such that the portion of the ball cage is within the spring. In another example, the grabbing mechanism further includes a plunger body, and the system further comprises a sensor configured to send a signal indicating a location of the plunger body. In this example, the sensor is a magnetic reed sensor. In addition or alternatively, the grabbing mechanism further includes an ejection cylinder including an ejection chamber, wherein the plunger body is arranged within the ejection chamber and the sensor is arranged adjacent to the ejection cylinder. In addition or alternatively, the system also includes a computing device, wherein the sensor is configured to send the signal to the computing device, and the computing device is configured to determine a position of the plunger body. In this example, in response to receiving the signal, the computing device is configured to cause the piston chamber to be pressurized. In another example, the system also includes a lifting mechanism including a crane. In another example, the grabbing mechanism further includes an ejector pin configured to eject the pull stud from the grabbing mechanism. In this example, the grabbing mechanism further includes a plunger including a plunger body and a plunger pin, The plunger pin is configured to mate with a depression in the ejector pin such that a force on the plunger body causes the plunger pin to force the ejector pin to move within the ball cage and to eject the pull stud from the grabbing mechanism. In addition, the grabbing mechanism further includes an ejection cylinder, and the plunger body is arranged within the ejection cylinder, such that pressurization of the ejection cylinder causes the force on the plunger body. In addition, the system also includes an air source configured to pressurize the ejection cylinder. In another example, the system also includes an air source configured to pressurize the piston chamber. In another example, the system includes the pull stud. In this example, the pull stud includes a head portion configured to force the plurality of balls to move into the groove when the groove is aligned with the respective ball chambers. In addition or alternatively, the pull stud includes a neck portion configured to allow the plurality of balls to lock the pull stud in the grabbing mechanism. In addition or alternatively, the pull stud includes a shoulder portion arranged to limit movement of the pull stud within the ball cage. In this example, the system also includes the object. In addition, the object is a balloon including a top cap, and the pull stud is attached to the top cap.

DETAILED DESCRIPTION

Figure 1:
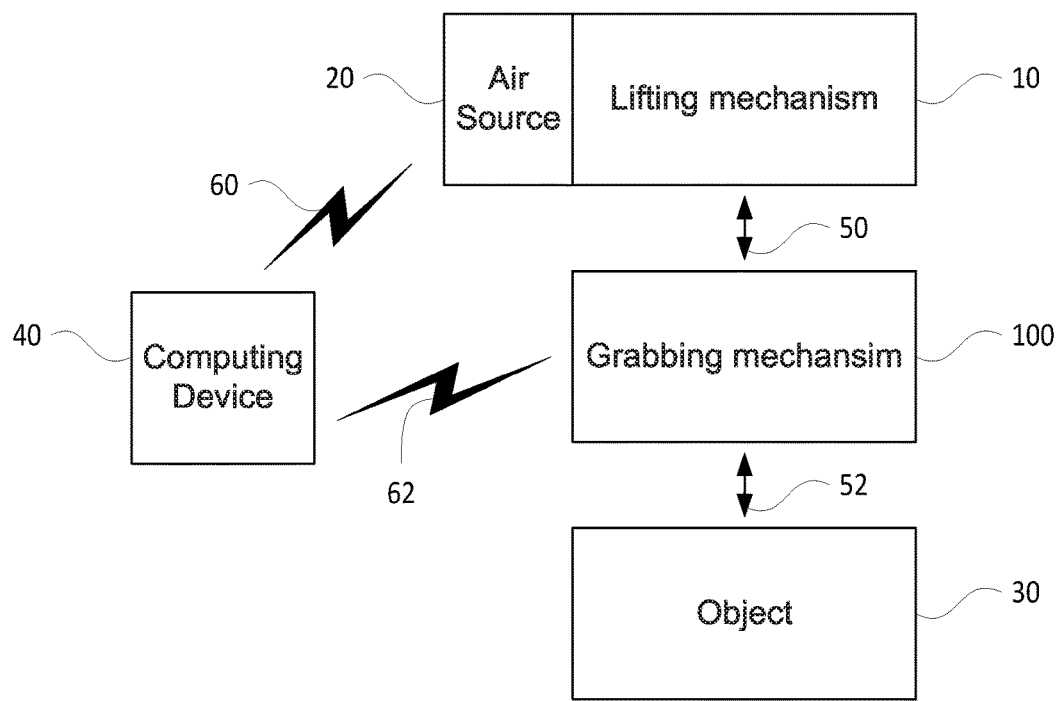
FIG. 1 is a functional diagram of a system in accordance with aspects of the present disclosure.

The technology relates to mechanisms for grabbing, holding, and releasing an object including a pull stud under high loads. For instance, a grabbing mechanism may enable a lifting mechanism to grab, lift, move, and release an object. An air source or compressor can provide pressurized air or gas to the grabbing mechanism in order to control the functions of the grabbing mechanism. A computing device may receive signals from the grabbing mechanism and control the operation of the air source and thereby control the functions of the grabbing mechanism.

The grabbing mechanism may include a plurality of structural features, which may include a mounting plate, a base, and a release cylinder. The release cylinder may include a cylinder housing, a piston chamber, and a piston. The piston may be configured to move within the piston chamber between first and second positions with respect to the cylinder housing.

A first end of the grabbing mechanism may include an ejection cylinder attached to the mounting plate. The ejection cylinder may allow for pneumatic operation of the grabbing mechanism via air or gas from the air source. The ejection cylinder may include an opening leading to an ejection chamber. This opening may be connected to the air source. When pressurized air or gas from the air source is forced through the opening into the ejection chamber, this may cause a force on a plunger within the ejection cylinder. This force causes the plunger to move away from the opening, thereby ejecting any pull stud within the grabbing mechanism assuming the mechanism is open.

The plunger may include a plunger pin which passes through respective openings in the mounting plate and base. The plunger pin may mate with an opening, slot or depression in a first end of an ejector pin. A second end of the ejector pin may be configured to contact an end of a pull stud. The ejector pin may be arranged to move within an opening in a ball cage.

The ball cage may include a plurality of balls each of which may rest within a ball chamber of the ball cage. The balls may be allowed to move in and out of a groove in collet to allow an opening through the ball cage to expand and contract laterally. The ball cage may be fixed against the base and biased away from a bottom ledge of the piston via one or more springs arranged around the ball cage.

A first end of the collet may include an opening to allow for the insertion of the pull stud into the collet and the ball cage. The collet also includes a groove. A second end of the collet, opposite of the first end, may be attached to the piston, such that the piston and collet may move together. Movement of the piston may be controlled by pressurizing or depressurizing the piston chamber within the cylinder housing.

The pull stud may include an enlarged head portion, a neck portion, and a shoulder portion. These features may allow for ease of attachment and release of the grabbing mechanism. The pull stud may be attached to any number of different objects in order to allow for quick and easy attachment to such objects.

A sensor may be attached to the ejection cylinder and used to detect determine the location and movement of a body of the plunger within the cylinder. The computing device may use a signal from the sensor to determine to detect whether or not the pull stud is inserted within the grabbing mechanism. This information may then be displayed to a human operator and used to control pressurization of the grabbing mechanism.

In order to insert and lock the pull stud into the grabbing mechanism, the first end of the grabbing mechanism may be placed over and aligned with the pull stud. Once aligned, the piston chamber may be pressurized. The pressurization may overcome the force of the spring on the piston, moving the piston within the piston chamber which also causes the collet to move over the ball cage. This movement may cause the ball chambers of the ball cage to align with the groove of the collet allowing the head portion of the pull stud to move through and beyond the balls. At the same time, the head portion of the pull stud may press into the ejector pin which causes the body to move within the ejection chamber into position adjacent to the sensor. The sensor may detect the change in the position of the body and send a signal to the computing device.

The computing device may determine from the signal that the pull stud is inserted into the grabbing mechanism. The computing device and/or a human operation may activate and cause the air source to again pressurize the piston chamber. As a result, the piston may automatically move within the piston chamber which may cause the collet to move over the ball cage. As such, the ball chambers will move out of alignment with the groove and lock the pull stud at the neck portion of the pull stud.

In order to release the pull stud, the air source may be used to pressurize the ejection chamber of the cylinder, pushing the body, plunger pin, and ejector pin against the head of the pull stud. In addition, the collet may move over the ball cage causing the ball chambers to align with the groove. As the head portion of the pull stud is pushed by the ejector pin, the head portion also forces the balls outward and into the groove. The head portion of the pull stud may now fit between the balls. The ejector pin may continue to push on the head portion of the pull stud until the pull stud is fully ejected from the collet The features described herein allow for quick and easy attachment and release of an object including a pull stud while also allowing for high load retention. For instance, the movement of an ejector pin when ejecting a pull stud may prevent the pull stud from binding up or getting stuck upon release. A sensor also allows for clear determination of the state of the grabbing mechanism. Also, as actuation of the mechanism is independent of the load path and the actuation cylinder has a high surface area to size ratio, the mechanism can withstand extremely high loading, failing only due to material limitations. And, in the event of a pneumatic or electrical failure, the mechanism is spring loaded shut which allows the mechanism to fail closed and hold, rather than drop, the load.

Aspects, features and advantages of the disclosure will be appreciated when considered with reference to the foregoing description of embodiments and accompanying figures. The same reference numbers in different drawings may identify the same or similar elements. Furthermore, the following description is not limiting; the scope of the present technology is defined by the appended claims and equivalents.

FIG. 1 depicts an example system in which a grabbing mechanism 100 as described above may be used to grab, lift, move, and release an object 30. This example should not be considered as limiting the scope of the disclosure or usefulness of the features described herein. For instance, a lifting mechanism 10 may include any device that can be used to lift objects, such as robotic arms, assembly machine parts, construction equipment, sorting machines, pick and place robots, various types of cranes, including gantry cranes and jib cranes, etc. The lifting mechanism 10 may be attached to or include an air source 20 or compressor which can provide pressurized air or gas to the grabbing mechanism as discussed further below. The arrows 50, 52 each represent mechanical connections, between the lifting mechanism 10 and grabbing mechanism 100 and between the grabbing mechanism 100 and the object 30, respectively, as discussed in further detail below. Data connections 60 each represent data connections (wired or wireless), between computing device 40 and lifting mechanism 10 and/or air source 20 and between computing device 40 and grabbing mechanism 100 respectively, as discussed further below.

The system also includes a computing device 40 which can receive signals from the grabbing mechanism 100. The computing device 40 may also be able to communicate with and control the lifting mechanism 10 manually (by a human operator) or autonomously. In this regard, the computing device 40 may include one or more processors, memory, and other components typically present in general purpose computing devices.

The memory may store information accessible by the one or more processors, including instructions and data that may be executed or otherwise used by the processor. For instance, these instructions may include instructions for display information to a human operator and/or instructions for controlling aspects of the lifting mechanism 10. The memory may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data may be retrieved, stored or modified by processor in accordance with the instructions. For instance, the data may include information regarding the status of the lifting mechanism 10, air source 20, and/or grabbing mechanism 100 as discussed further below. Although the claimed subject matter is not limited by any particular data structure, the data may be stored in computing device registers, in a relational database as a table having a plurality of different fields and records, XML documents or flat files. The data may also be formatted in any computing device-readable format.

The one or more processor may be any conventional processors, such as commercially available CPUs. Alternatively, the one or more processors may be a dedicated device such as an ASIC or other hardware-based processor. The processor, memory, and other elements of computing device 40 may be arranged within the same block or device, or alternatively, may be arranged remotely from one another. In addition, the processor, computing device, or memory may actually include multiple processors, computing devices, or memories that may or may not be stored within the same physical housing.

Computing device 40 may all of the components normally used in connection with a computing device such as the processor and memory described above as well as a user input (e.g., a mouse, keyboard, touch screen and/or microphone) and various electronic displays (e.g., a monitor having a screen or any other electrical device that is operable to display information in accordance with the instructions and data to a human operator).

Computing device 40 may also include one or more wired connections and/or wireless network connections, such as transmitters and receivers, to facilitate communication with other computing devices, such as the lifting mechanism 10, air source 20, and grabbing mechanism 100 as discussed below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2:
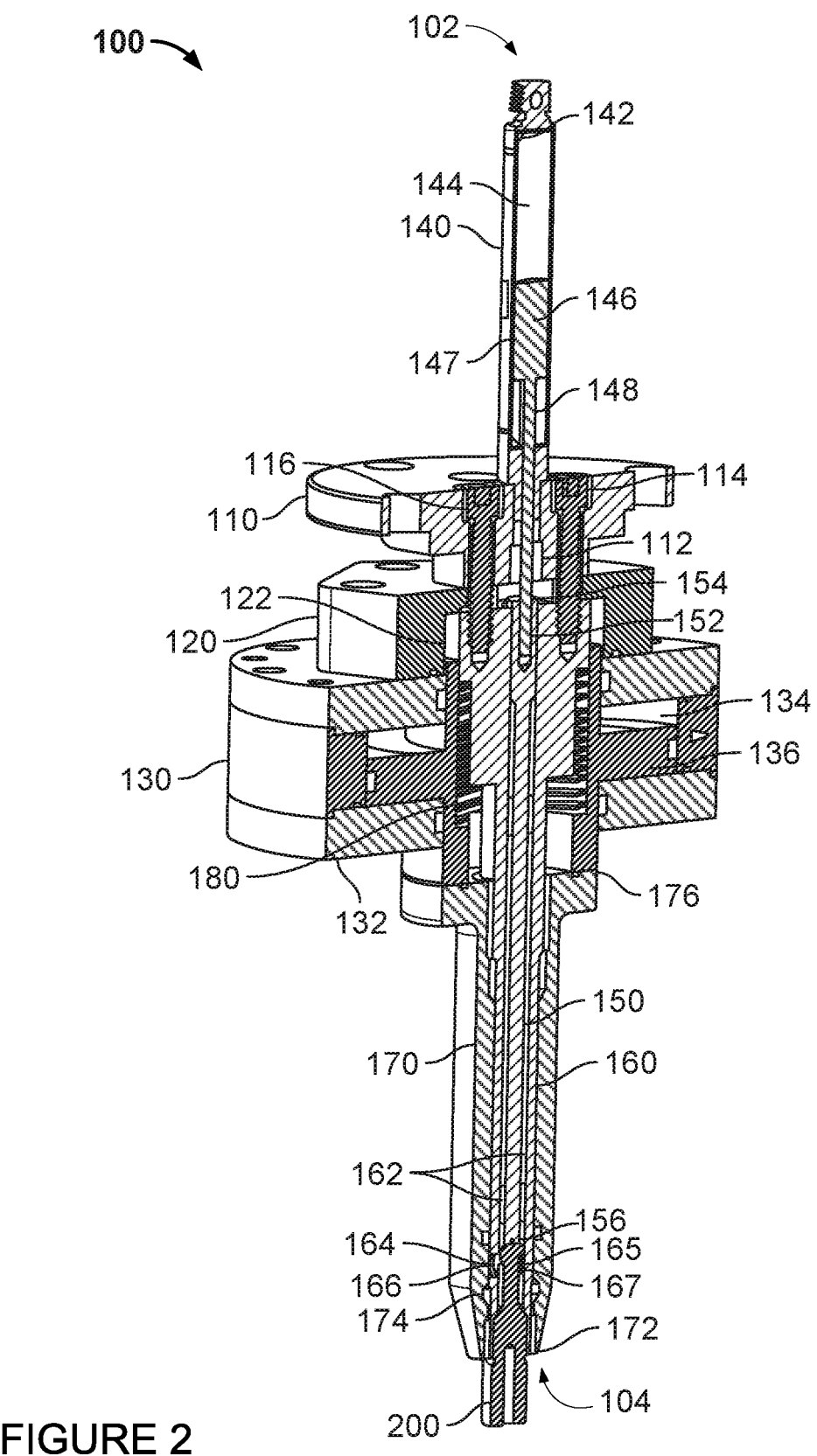
FIG. 2 is a cross-sectional view of a grabbing mechanism and pull stud in accordance with aspects of the disclosure.

As shown in FIG. 2, the grabbing mechanism 100 may include a plurality of structural features, including a mounting plate 110, a base 120, and a release cylinder 130. The mounting plate 110, base 120, and release cylinder 130 are fixed relative to or rather secured to one another via screws 114, 116.

The release cylinder 130 includes a cylinder housing 132, a piston chamber 134, and a piston 136. The release cylinder 130 may be a high load release cylinder having a high surface area to size ratio, enabling high load release, (for instance, up to 200 pounds or more or less) of an object, such as object 30, attached to the pull stud 200. The piston 136 may be configured to move within the piston chamber 134 between a first position with respect to the cylinder housing 132 shown in FIG. 2 and a second position with respect to the cylinder housing shown in FIG. 4.

A first end 102 of the grabbing mechanism 100 includes an ejection cylinder 140 attached to the mounting plate 110. The ejection cylinder 140 may allow for pneumatic operation of the grabbing mechanism 100. For instance, the ejection cylinder 140 includes an opening 142 (clearly visible in FIG. 4) leading to an ejection chamber 144. This opening may be connected to the air source 20. When pressurized air or gas from the air source 20 is forced through the opening 142 into the ejection chamber 144, this may cause a force on a plunger 146 within the ejection cylinder 140. This force causes the plunger 146 to move away from the opening 142, and eventually ejecting any pull stud within the grabbing mechanism.

The plunger 146 includes a plunger pin 148 which passes through respective openings 112, 122 in the mounting plate 110 and base 120. The plunger pin 148 may mate with an opening, slot or depression 152 in a first end 154 of an ejector pin 150. A second end 156 of the ejector pin 150 is configured to contact an end of a pull stud 200 as shown in FIG. 2. The ejector pin 150 may be arranged to move within an opening 162 in a ball cage 160.

The ball cage 160 may include a plurality of balls 164, 165, each of which may rest at least partially within a respective ball chamber, such as ball chambers 166, 167 of the ball cage. Five or more or less balls may be used depending upon the size of the balls, a collet 170, and ball cage 160 as well as the mechanical properties of the grabbing mechanism. The balls 164, 165 may be allowed to move in and out of a groove 174 in collet 170 to allow the ball cage to expand and contract laterally as discussed further below.

Figure 3:
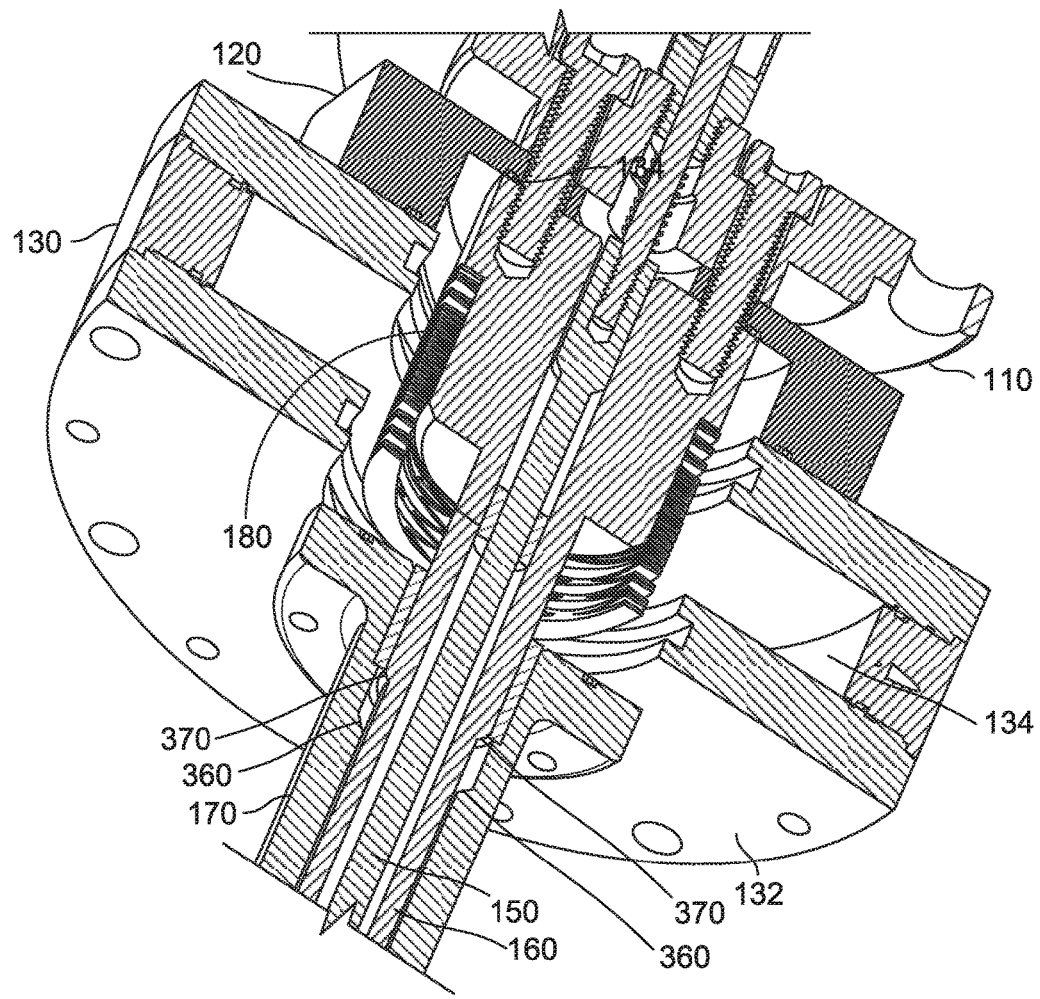
FIG. 3 is a cross-sectional view of a portion of the grabbing mechanism with a piston removed in accordance with aspects of the disclosure.

The ball cage 160 may be fixed against the base and biased away from a bottom ledge of the piston 136 via one or more springs, such as spring 180, arranged around the ball cage 160. For instance, FIG. 3 provides a detail view of spring 180 arranged around or encircling the ball cage 160. In other words, a portion of the ball cage is arranged within the spring 180. The spring 180 biases the piston 136 away from the second end 104. This configuration including the one or more springs may prevent the grabbing mechanism 100 from "failing open" and dropping object 30 an inopportune moment which could potentially be dangerous. Rather, if there is a loss of pressure in the piston chamber 134, the grabbing mechanism 100 may automatically close.

Figure 5A:
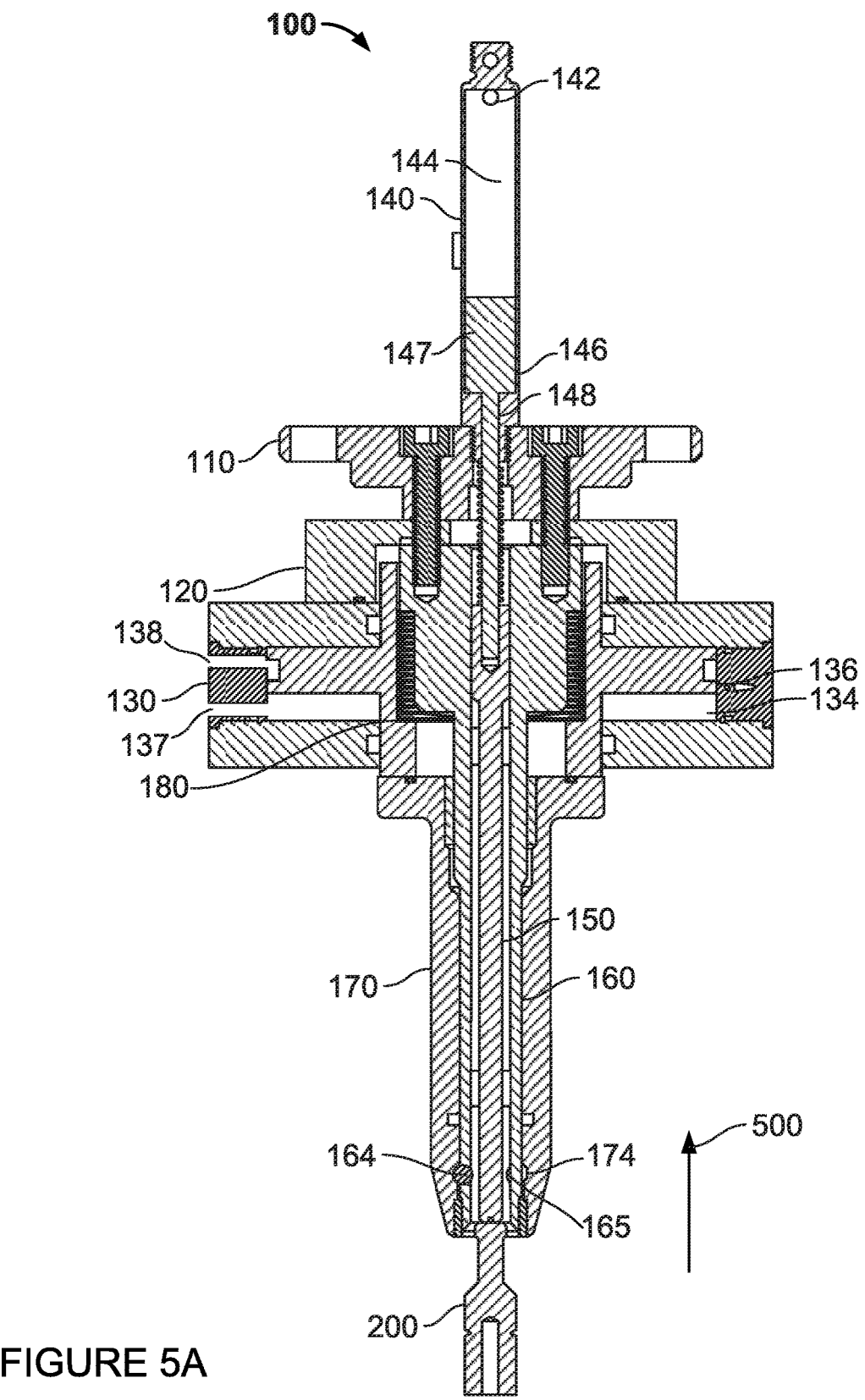
FIG. 5A is a cross-sectional view of a grabbing mechanism and pull stud in accordance with aspects of the disclosure.

A first end 172 of the collet 170 may include an opening to allow for the insertion of the pull stud 200 into the collet 170 and the ball cage 160. The collet 170 also includes a groove 174. Turning to the detail view of FIG. 5, the first end 172 of the collet 170 includes an attached ring or collar 570 which includes a first projection 572 which interferes with a corresponding first interference area 560 on the ball cage 160 in order to keep the collet 170 concentric with respect to the ball cage 160. Similarly, as shown in FIG. 3, towards the second end 176 of the collet 170 is a second interference area 370 which interferes with a corresponding second projection 360 on the ball cage 160 in order to keep the collet 170 concentric with respect to the ball cage 160. These features may enable "straight" sliding of the collet with respect to the ball cage.

A second end 176 of the collet 170, opposite of the first end 172, may be attached to the piston 136 via screws, welding, or other connection devices or methods, such that the piston 136 and collet 170 may move together. Movement of the piston 136 may be controlled by pressurizing or depressurizing the piston chamber 134 within the cylinder housing 132. In this regard, the piston chamber 134 may also include one or more openings 137, 138 (shown in FIG. 4) connected to the air source 20 or a different air source (not shown).

Figure 6A:
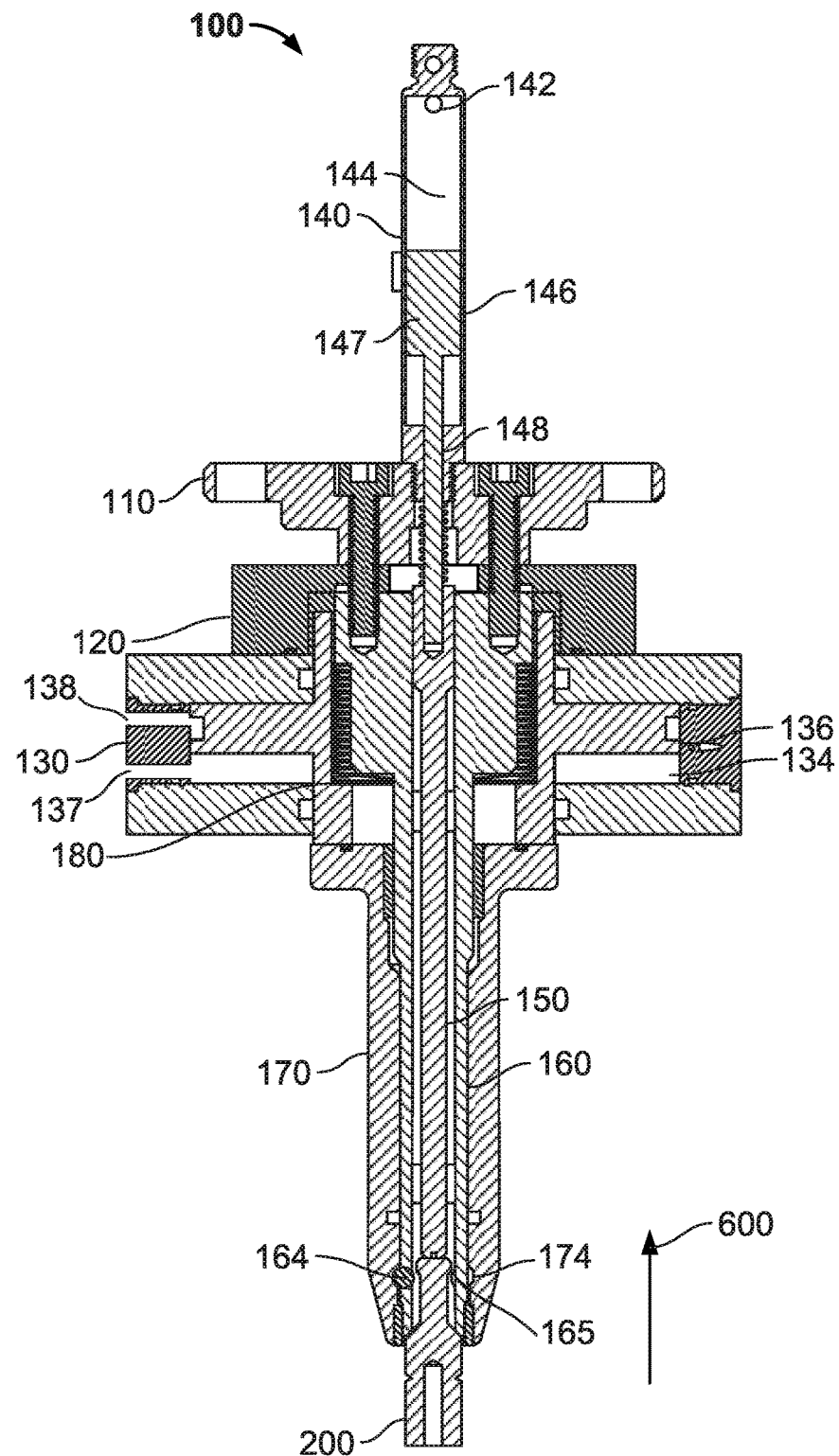
FIG. 6A is a cross-sectional view of a grabbing mechanism and pull stud in accordance with aspects of the disclosure.
Figure 6B:
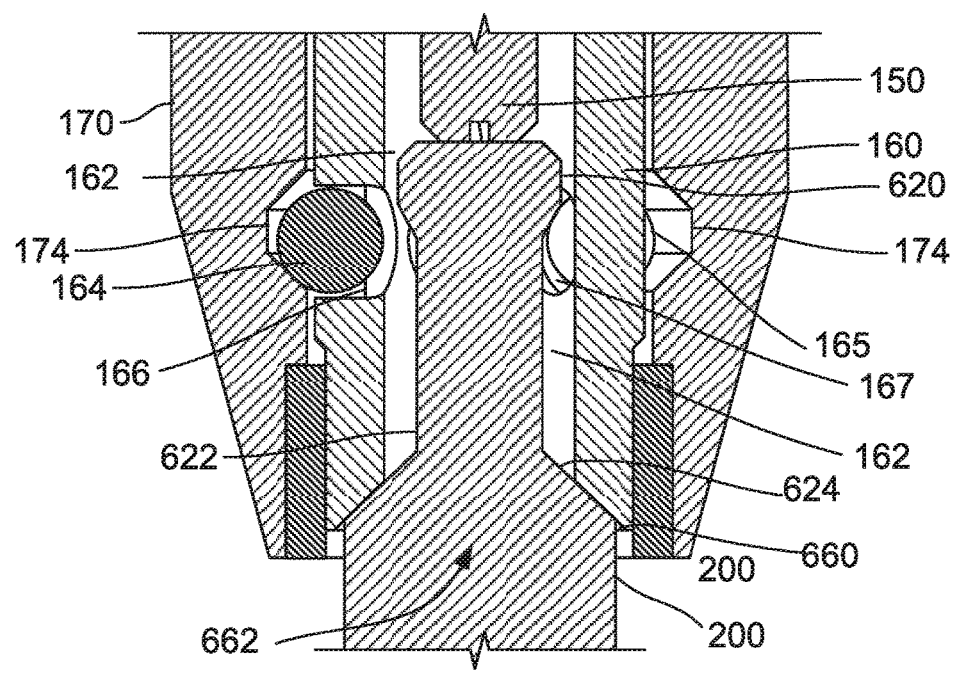
FIG. 6B is a detail view of a portion of FIG. 5A in accordance with aspects of the disclosure.

Turning to the detail view of FIG. 6B, the pull stud 200 includes a head portion 620, a neck portion 622, and a shoulder portion 624. These features may allow for ease of attachment and release of the grabbing mechanism 100. As discussed further below, the pull stud 200 may be attached to any number of different objects in order to allow for quick and easy attachment to such objects.

Figure 7A:
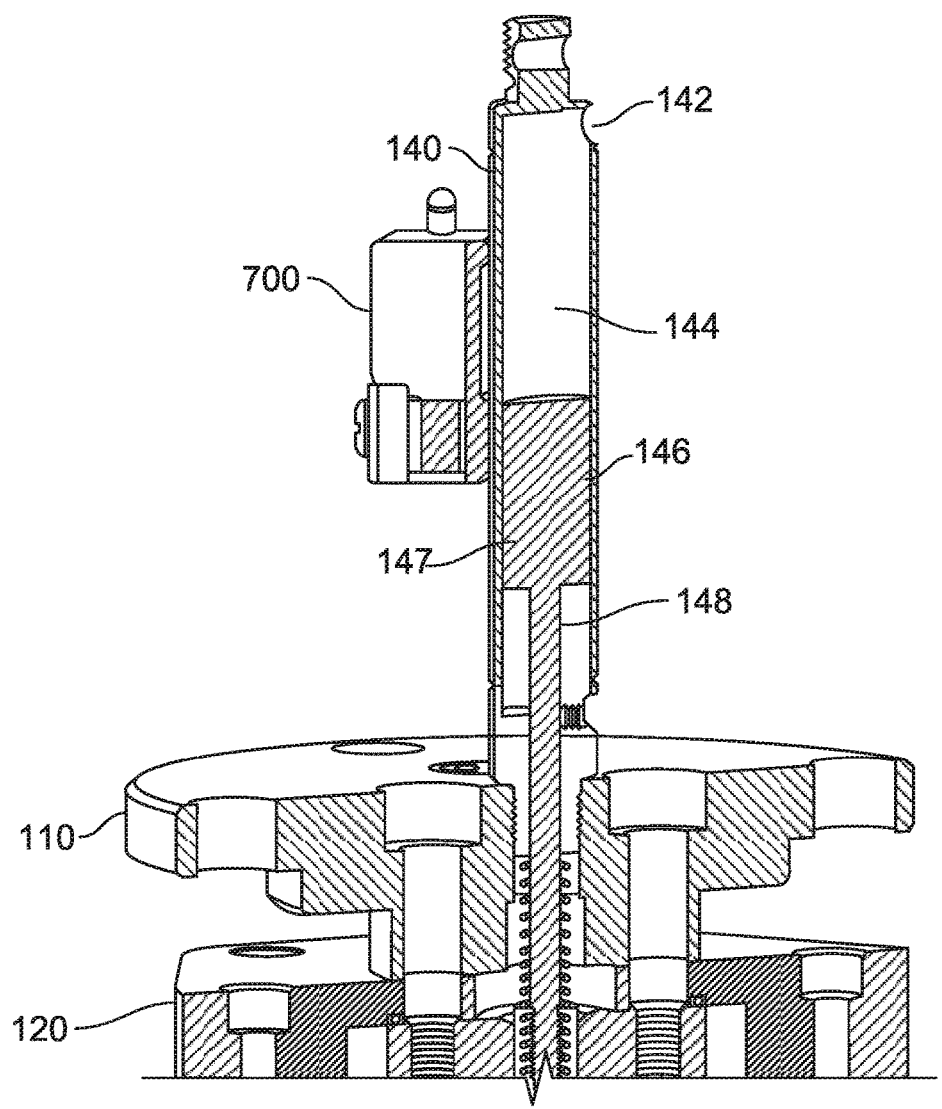
FIG. 7A is a cross-sectional view of a portion of a grabbing mechanism with an attached sensor in accordance with aspects of the disclosure.
Figure 7B:
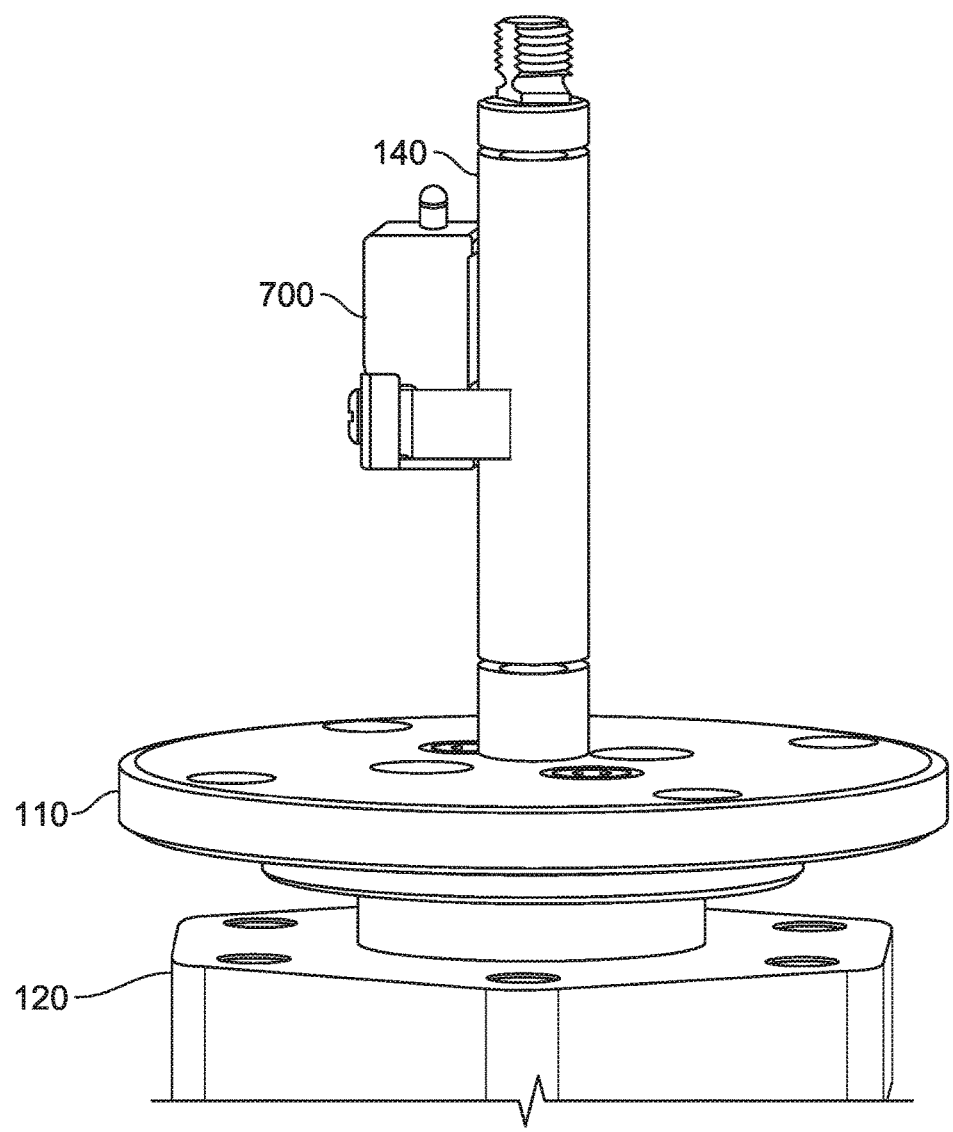
FIG. 7B is a perspective view of the portion of a grabbing mechanism with the attached sensor as depicted in FIG. 7A in accordance with aspects of the disclosure.

As shown in FIG. 7A, a sensor 700 may be attached to or located adjacent to the ejection chamber 144. The sensor may be used to detect determine the location and movement of a body 147 of the plunger within the cylinder. In this regard, the sensor 700 may be used to detect whether or not the pull stud 200 is inserted within the grabbing mechanism 100 based on the position of the body 147. As an example, the sensor 700 may include a magnetic reed sensor or switch. In this regard when the body 147 may be magnetized. Thus, when the body 147 is directly adjacent to a pair of reeds with the sensor 700, the magnetic field from the body may cause the pair of reeds within the sensor 700 to contact one another and pass a signal. This signal may indicate that the pull stud 200 has been inserted into or is within the grabbing mechanism 100.

Figure 8A:
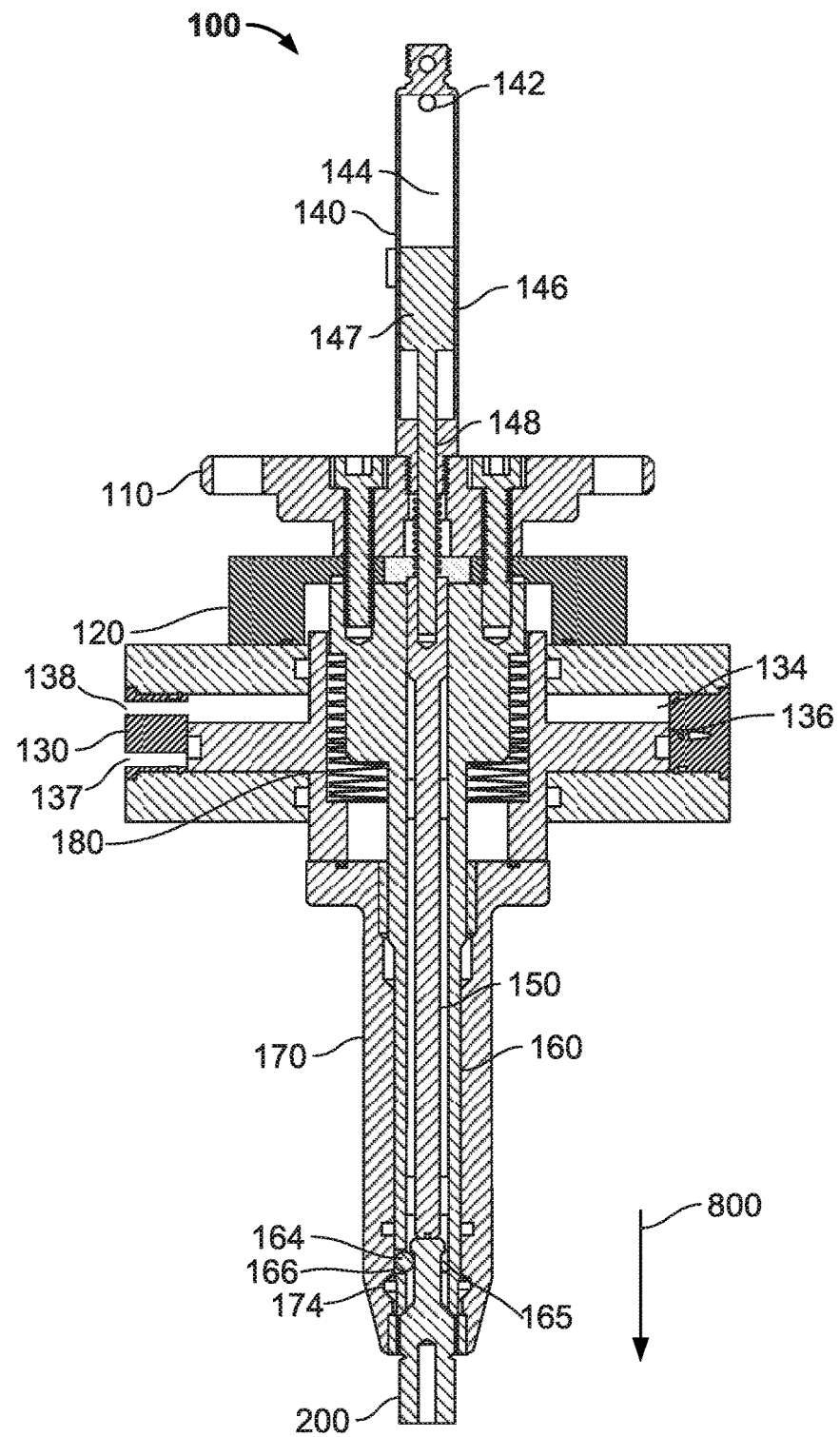
FIG. 8A is a cross-sectional view of a grabbing mechanism and pull stud in accordance with aspects of the disclosure.

For instance, when a pull stud 200 is initially inserted as shown in FIG. 5, the head of the pull stud 200 may push on the ejector pin 150 when moved in the direction of arrow 600. The ejector pin 150 may, in turn, push on the plunger pin 148 which causes the body 147 to move within the ejection chamber 144 back towards the opening 142 as shown in FIG. 6A which corresponds to the position of the body 147 shown in FIG. 7A. As such, the body 147 is directly adjacent to the pair of reeds of the reed sensor causing the reeds to contact one another and pass a signal. This positioning of the body 147 may indicate, for instance, that the pull stud 200 has been inserted or is within the ball cage 160 as shown in FIG. 2, 6A, or 7A. FIG. 6A represents a same state of the grabbing mechanism 100 and the pull stud 200 as FIG. 2 from a different perspective. In FIG. 8A, the pull stud 200 is locked into the ball cage 160. This signal (or a corresponding signal generated at the sensor in response to the signal) may be sent, for instance via a transmitter, to the remote computer 40.

Figure 4:
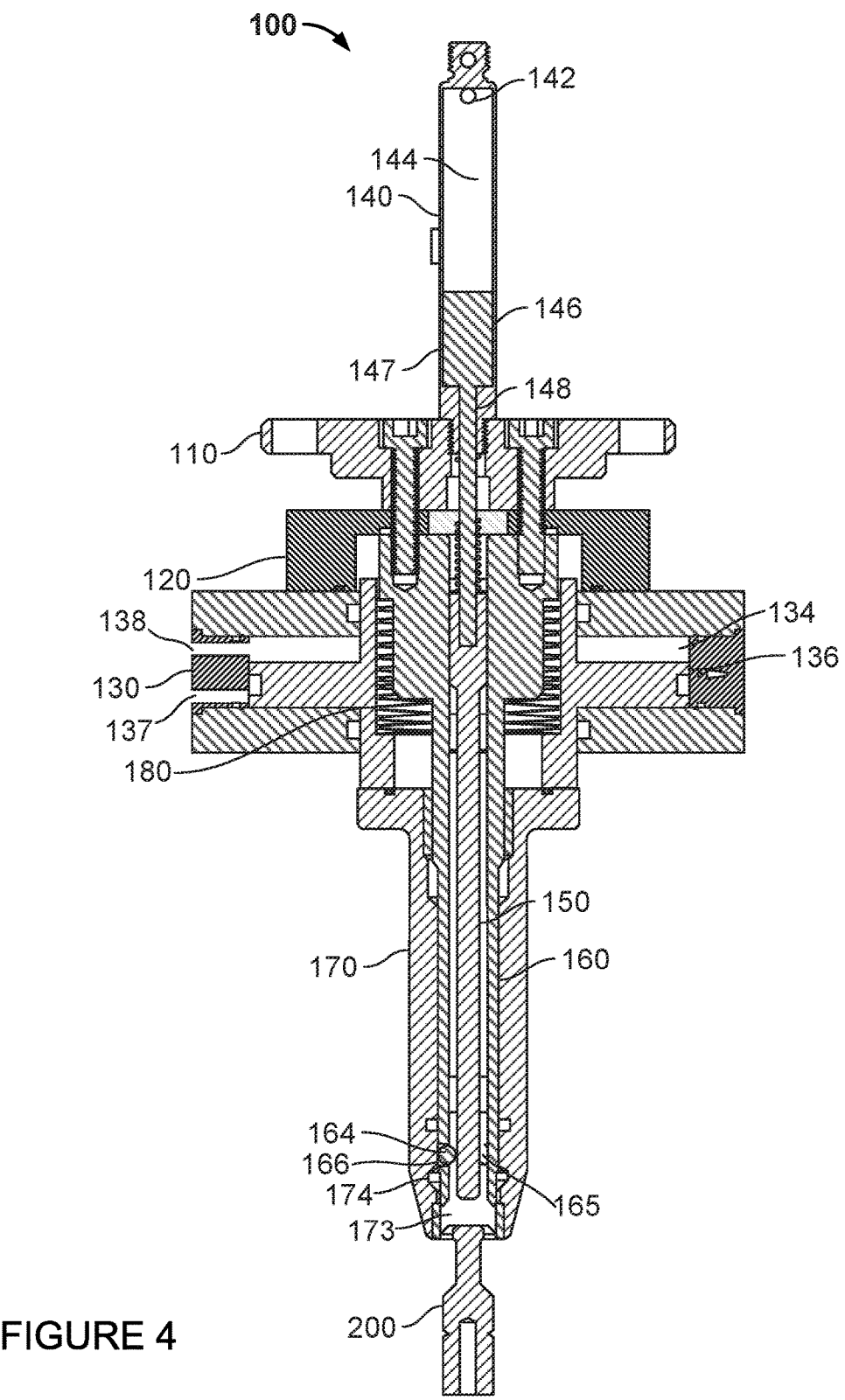
FIG. 4 is a cross-sectional view of a grabbing mechanism and pull stud in accordance with aspects of the disclosure.

The computing device 40 may use the signal, data and instructions to determine that the body 147 is adjacent to the pair of reeds and therefore in the positions shown in any of FIG. 2 or 6A. This information may then be displayed to a human operator. As soon as the body 147 is moved away from and no longer directly adjacent to the pair of the reeds of the sensor 700, the contact between the pair of reeds is broken, and the signal is no longer passed. In this regard, the computing device 40 would not receive a signal or would receive a different signal from the sensor 700, and the computing device 40 may determine that the pull stud 200 is not in the position shown in any of FIG. 2 or 6A. In this regard, the pull stud 200 may be as shown in FIG. 4.

If the sensor 700 include multiple pairs of reeds at different positions within the sensor, these additional pairs of reeds may be used in a similar manner to that discussed above in order to allow the computing device differentiate between the positions of the body 147 in FIG. 2 or 6A when the pull stud 200 is within the ball cage 160, but not yet locked, and FIG. 8A when the pull stud is locked within the ball cage. Though this may not be necessary as the period of time between when the pull stud 200 is inserted and when the pull stud is locked is so brief. However, the computing device may display this information to a human operator and/or use the information to control the lifting mechanism 10, for instance to move the object 30 up, down, laterally, etc. Thus, a magnetic reed sensor may provide an inexpensive and highly reliable way to determine the state of the grabbing mechanism. Alternatively, rather than using a reed sensor, inductive proximity switches, laser sensing, vision sensing or any number of other common sensing techniques may be used to detect the state of the plunger and determine the state of the grabbing mechanism.

In addition, to increase the load capabilities of a lifting mechanism 10, a plurality of grabbing mechanisms 100, such as 3 or 4 or more or less, may be used in conjunction with a plurality of pull studs, such as pull stud 200, to grab and lift an object. For instance, the mounting plates of the plurality of grabbing mechanisms may be attached via fasteners, welding, or other attachment configurations to a support structure such as a mounting plate, bracket or other structure which allows for attachment to the lifting mechanism 10. Each of the grabbing mechanisms 100 may be activated individually in order to grab and release a corresponding pull stud, the same or similar to pull stud 200, attached to an object, such as object 30.

In order to insert and lock the pull stud 200 into the grabbing mechanism 100, the first end 104 of the grabbing mechanism 100 may be placed over and aligned with the pull stud 200. For instance the opening 173 of the collet 170 may be aligned with the head portion 720 of the pull stud 200 as shown in FIG. 4.

Once aligned, the piston chamber 134 may be pressurized. For instance, an operator may use the computing device 40 to activate and cause the air source 20 to pressurize the piston chamber 134 within the release cylinder 130. For instance, airsource 20 may force gas through opening 137 in order to pressurize the piston chamber. The pressurization may overcome the force of the spring 180 on the piston 136. Eventually, the pressurization may cause the piston 136 to move within the piston chamber 134 from the position shown in FIG. 4 in the direction of arrow 500 to the position shown in FIG. 5A. This movement may cause the ball chambers 166, 167 of the ball cage 160 to will align with the groove 174 of the collet 170. This may allow the pull stud 200 to move through and beyond the balls 164, 165 and further into the ball cage 160 in the direction of arrow 600 to the position shown in FIG. 6A.

At the same time, the head portion 620 of the pull stud 200 to press into the ejector pin 150. Because the plunger in 148 is within the depression 152 of the ejector pin 150, the ejector pin may push upward on the plunger pin 148 moving the plunger pin away from the opening 173 of the collet 170 in the direction of arrow 600 of FIG. 6A. This movement of the plunger pin 148 may cause the body 147 to move within the ejection chamber 144 into position adjacent to the sensor 700. The sensor 700 may detect the change in the position of the body 147 as discussed above and send a signal to the computing device 40 indicating the position of the body 147.

The computing device 40 may determine from the signal that the pull stud 200 is inserted into the grabbing mechanism 100. The computing device 40 may display this information to an operator who may activate and cause the air source 20 to again pressurize the piston chamber 134 within the release cylinder 130. In this instance, air source 20 may force gas through opening 138 in order to pressurize the piston chamber. Alternatively, the computing device 40 may automatically send a signal to the air source 20 in order to activate and cause the air source 20 to pressurize the piston chamber 134 within the release cylinder 130.

Figure 8B:
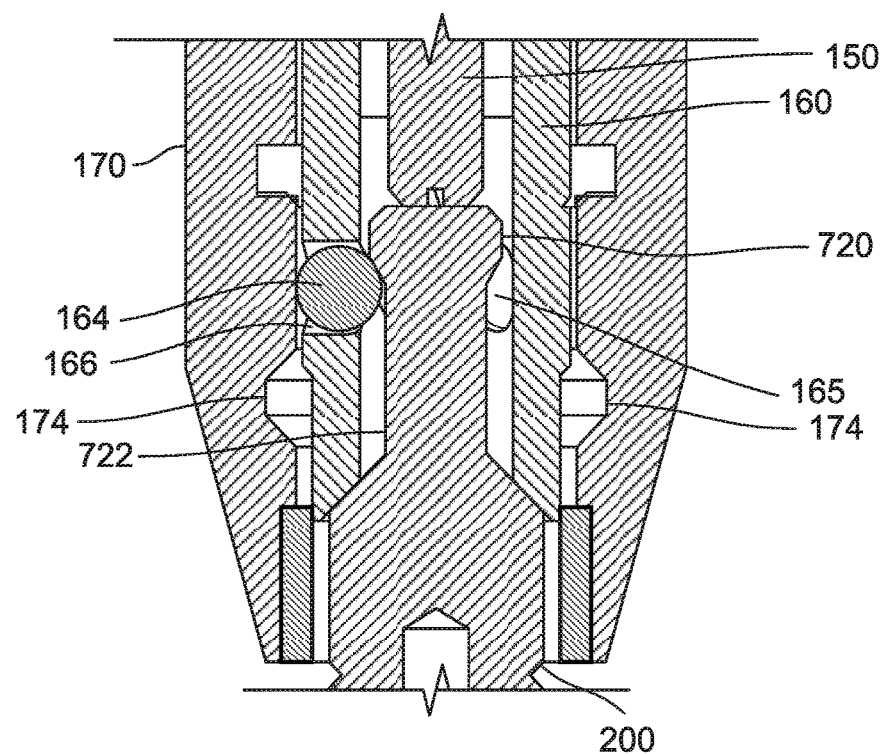
FIG. 8B is a detail view of a portion of FIG. 8A in accordance with aspects of the disclosure.

The pressurization may cause the piston 136 to move within the piston chamber 134 to move within the piston chamber 134 from the position shown in FIG. 6A in the direction of arrow 700 to the position shown in FIG. 8A. This, in turn, may cause the collet 170 attached to the piston 136 to move over the ball cage 160. As the collet 170 moves, the ball chambers 166, 167 will move out of alignment with the groove 174 as shown in FIGS. 8A and 8B. In this regard, FIG. 8B is a detail view of FIG. 8A. This may also cause the balls 164, 165 to be pushed back into or towards the center of the ball cage 160 and thereby locking the balls at the neck portion 622 of the pull stud 200. The head portion 620 may take various shapes, but may be enlarged relative to the neck portion 622 of the pull stud 200 in order to prevent the pull stud 200 from inadvertently sliding through the balls. The shoulder portion 624 of the pull stud 200 and an edge 660 of an open end 662 of the ball cage 160 may limit movement of the pull stud 200 within the ball cage 160 as shown in FIGS. 6A and 8A, and there prevent the pull stud 200 from moving too far into the ball cage 160 and collet 170. At this point, a lifting mechanism, such as lifting mechanism 10, may be used, for instance by an operator using computing device 40, in order to lift and/or move the object, such as object 30, attached to the pull stud 200.

Figure 9:
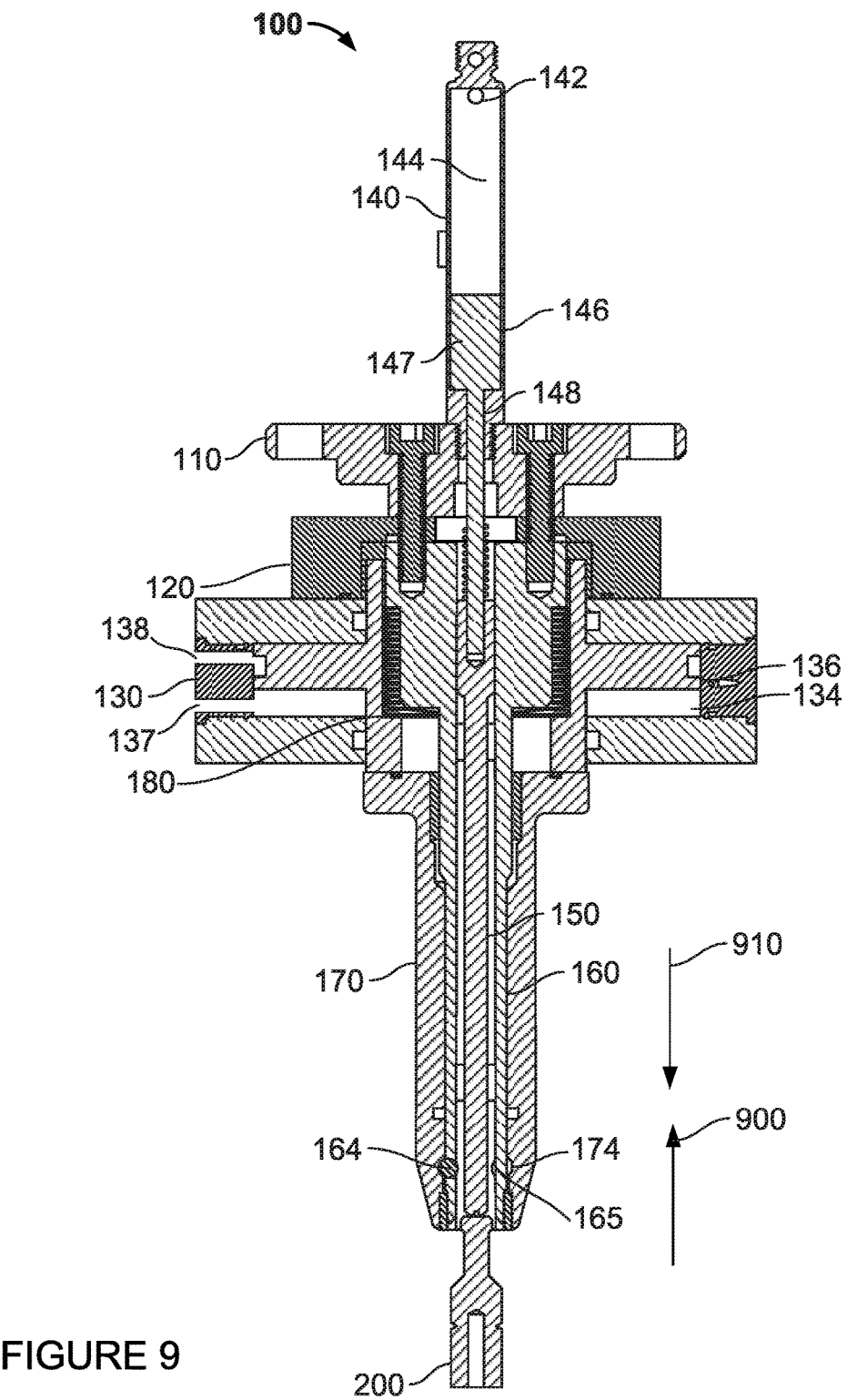
FIG. 9 is a cross-sectional view of a portion of the grabbing mechanism with a piston removed in accordance with aspects of the disclosure.

In order to release the pull stud 200, the air source 20 may be used to pressurize the piston chamber 134 of the release cylinder 130. The pressurization may force the piston 136 and the collet 170 in the direction of arrow 900 towards the mounting plate. In addition, the ejection chamber 144 of the cylinder 140 may be pressurized, pushing the body 147, plunger pin 148, and ejector pin 150 against the head of the pull stud 200 in the direction of arrow 910. In addition, the collet 170 may move over the ball cage 160 causing the ball chambers 166, 167 to align with the groove 174. As the head portion 620 of the pull stud 200 is pushed in the direction of arrow 910, the head portion also forces the balls 164, 165 outward and into the groove 174 as shown in FIGS. 6A and 6B. The head portion 270 of the pull stud 200 may now fit between the balls 164, 165. The ejector pin 150 may continue to push on the head portion 270 of the pull stud 200 until the pull stud is ejected or otherwise released from the collet as shown in FIG. 9. Eventually, the ejection chamber 144 will depressurize, for instance automatically through opening 142 and the piston chamber 134 may again be pressurized though opening 138 to allow the grabber mechanism 100 to be used to grab another (or the same) pull stud.

Figure 5B:
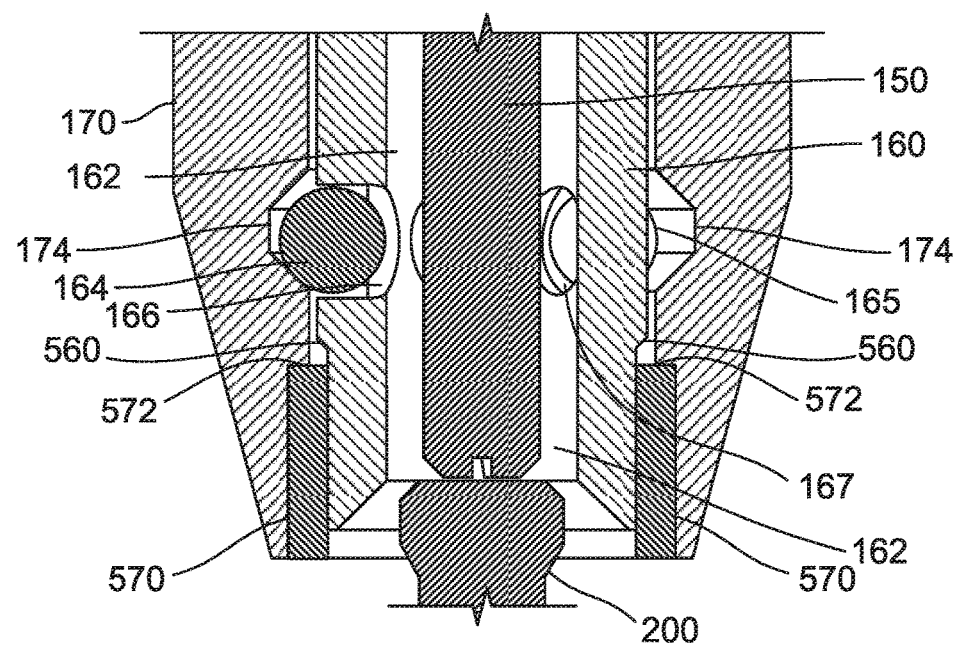
FIG. 5B is a detail view of a portion of FIG. 5A in accordance with aspects of the disclosure.

As noted above, as the piston 136 and collet 170 move in the various directions with respect to the ball cage 160, the first projection 572 of the collar 570 may interfere with the corresponding first interference area 560 on the ball cage 160 in order to keep the collet 170 concentric with respect to the over the ball cage 160 (as shown in FIG. 5B), and the second interference area 370 of the collet 170 may interfere with the corresponding second projection 360 on the ball cage 160 in order to keep the collet 170 concentric with respect to over the ball cage 160 (as shown in FIG. 3).

As noted above, object 30 may be any type of object with an attached pull stud configured the same as or similarly to pull stud 200. The above-described aspects of the technology may be of particular use advantageous for lifting a balloon envelope of a high-altitude balloon. For instance, the pull stud may be attached to a balloon, and the grabbing mechanism used to lift and hold the balloon during manufacture, during inflation (for instance, straight out of a shipping or storage box), and just prior to launch.

Figure 10:
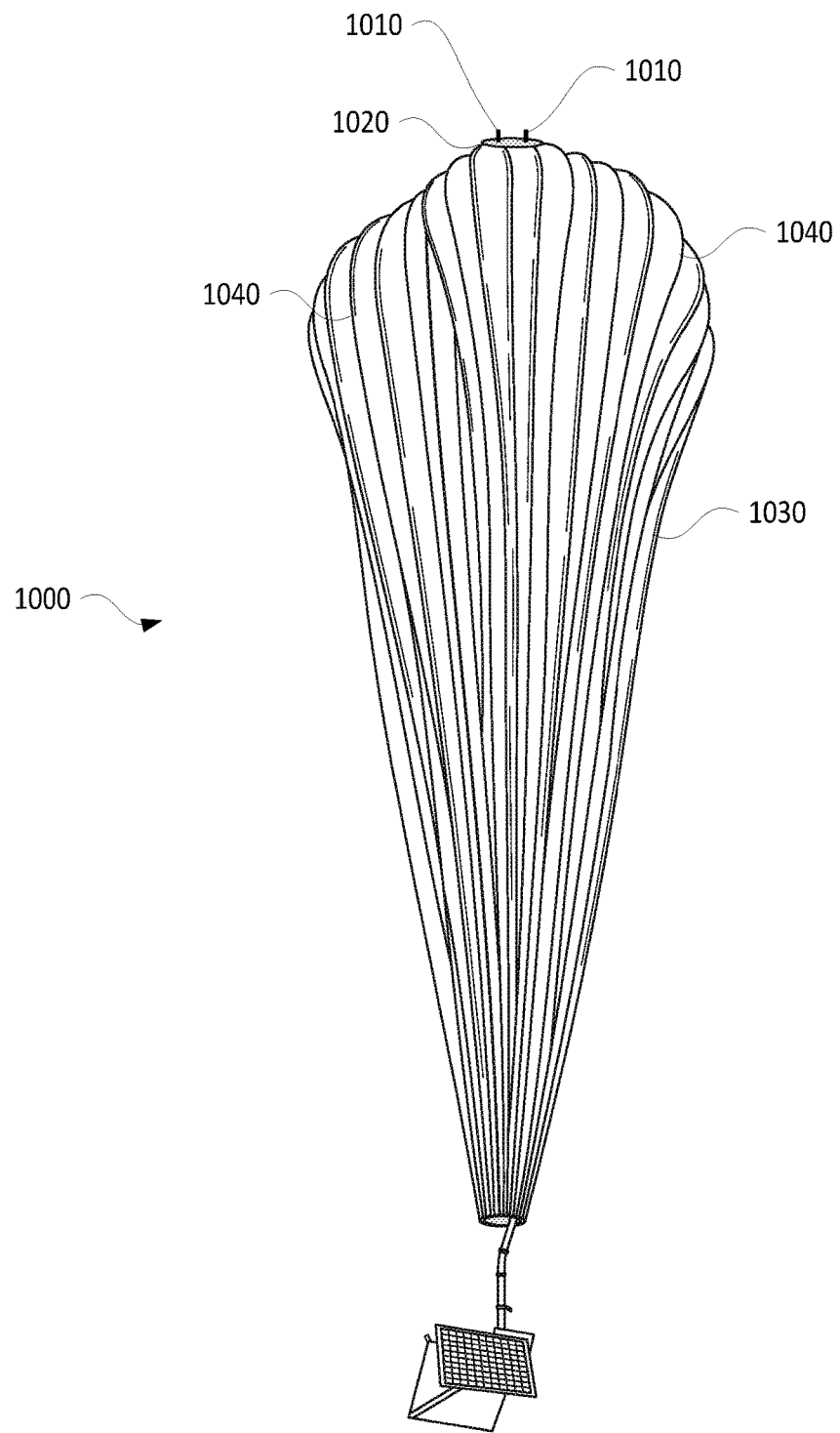
FIG. 10 is an example of a balloon being lifted by a grabber mechanism in accordance with aspects of the disclosure.

As an example, and referring to the example balloon 1000 of FIG. 10, one or more pull studs 1010, which may be the same as or similar to pull stud 200, may be attached to a top cap 1020 of a balloon envelope 1030. The top cap 1020 may provide a mounting location for structural tendons 1040 of the balloon envelope 1030. One or more grabbing mechanisms 100 may then be used to grab, lift, and/or move the balloon 1000 at the pull studs 1010. Lifting from the top cap 1020 may allow the balloon envelope 1030 to be inflated without the need to lay the balloon envelope out on the ground and thereby protect the balloon envelope 1030 from damage that can short the flight life of the balloon 1000. Moreover, the various components of the grabbing mechanism 100 may be modified to further manage and facilitate lifting and filling the balloon envelope 1030 while it is being inflated.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A system for grabbing an object including a pull stud, the system comprising:
   a grabbing mechanism including:
      a piston chamber having a piston configured to move within the piston chamber when the piston chamber is pressurized;
      a collet attached to the piston such that the collet and piston move together when the piston moves, the collet including a groove;

a ball cage including a plurality of balls arranged at least partially within respective ball chambers of the ball cage, the ball cage being arranged at least partially within the collet such that movement of the piston and collet causes the groove to align with the respective ball chambers, wherein the plurality of balls are configured to move into and out of the groove and to lock the pull stud within the grabbing mechanism; and a plunger body; and a sensor configured to send a signal indicating a location of the plunger body.

2. The system of claim 1, wherein the grabbing mechanism further includes a spring configured to bias the piston in a first direction such that pressurization of the piston chamber causes the piston to overcome a force of the spring on the piston.

3. The system of claim 2, wherein the spring is arranged around a portion of the ball cage such that the portion of the ball cage is within the spring.

4. The system of claim 1, wherein the sensor is a magnetic reed sensor.

5. The system of claim 1, wherein the grabbing mechanism further includes an ejection cylinder including an ejection chamber, wherein the plunger body is arranged within the ejection chamber and the sensor is arranged adjacent to the ejection cylinder.

6. The system of claim 1, further comprising a computing device, wherein the sensor is configured to send the signal to the computing device, and wherein the computing device is configured to determine a position of the plunger body.

7. The system of claim 6, wherein in response to receiving the signal, the computing device is configured to cause the piston chamber to be pressurized.

8. The system of claim 1, further comprising a lifting mechanism including a crane.

9. The system of claim 1, wherein the grabbing mechanism further includes an ejector pin configured to eject the pull stud from the grabbing mechanism.

10. The system of claim 9, wherein the grabbing mechanism further includes a plunger including the plunger body and a plunger pin, the plunger pin being configured to mate with a depression in the ejector pin such that a force on the plunger body causes the plunger pin to force the ejector pin to move within the ball cage and to eject the pull stud from the grabbing mechanism.

11. The system of claim 10, wherein the grabbing mechanism further includes an ejection cylinder, wherein the plunger body is arranged within the ejection cylinder, such that pressurization of the ejection cylinder causes the force on the plunger body.

12. The system of claim 11, further comprising an air source configured to pressurize the ejection cylinder.

13. The system of claim 1, further comprising an air source configured to pressurize the piston chamber.

14. The system of claim 1, further comprising the pull stud.

15. The system of claim 14, wherein the pull stud includes a head portion configured to force the plurality of balls to move into the groove when the groove is aligned with the respective ball chambers.

16. The system of claim 14, wherein the pull stud includes a neck portion configured to allow the plurality of balls to lock the pull stud in the grabbing mechanism.

17. The system of claim 14, wherein the pull stud includes a shoulder portion arranged to limit movement of the pull stud within the ball cage.

18. The system of claim 17, further comprising the object.

19. The system of claim 18, wherein the object is a balloon including a top cap, and the pull stud is attached to the top cap.

* * * * *